July 8, 1958 — E. FREY — 2,842,245
AUTOMATIC TRANSCRIBER AND COMPOSER
Filed Sept. 18, 1956 — 6 Sheets-Sheet 3
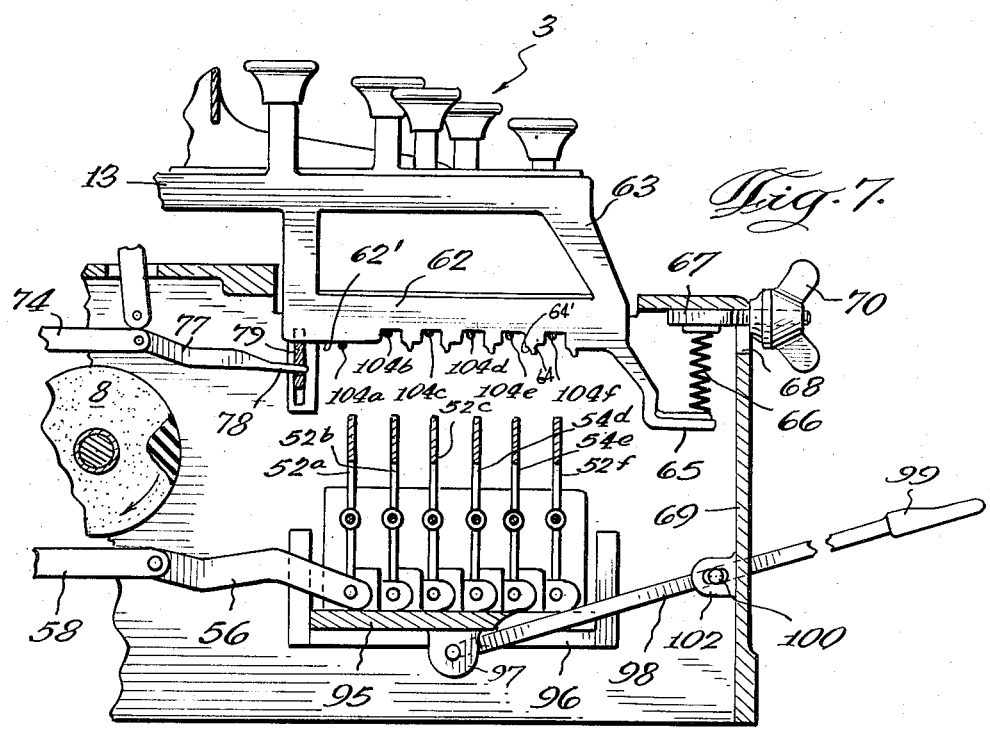
Fig. 7.
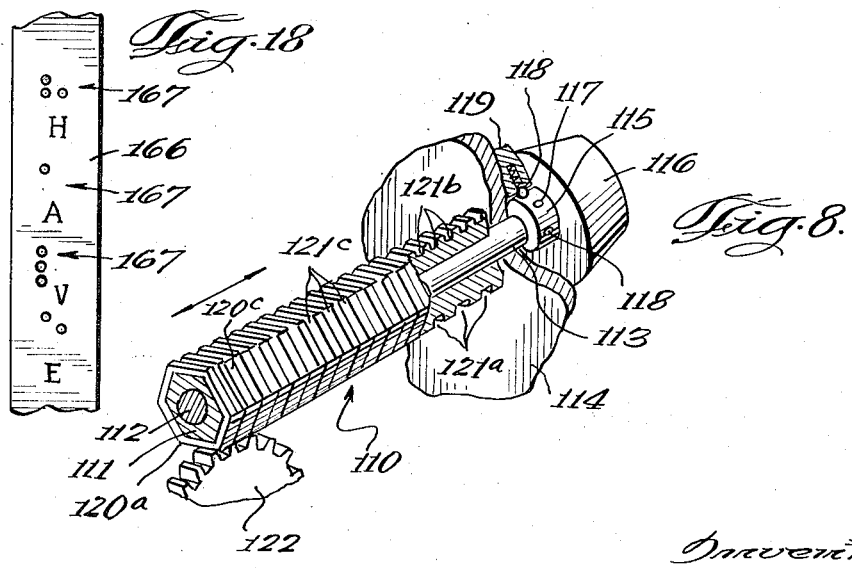
Fig. 18.
Fig. 8.
Inventor
Erik Frey
By Myron C. Cass
Attorney July 8, 1958
E. FREY
2,842,245
AUTOMATIC TRANSCRIBER AND COMPOSER
Filed Sept. 18, 1956
6 Sheets—Sheet 4
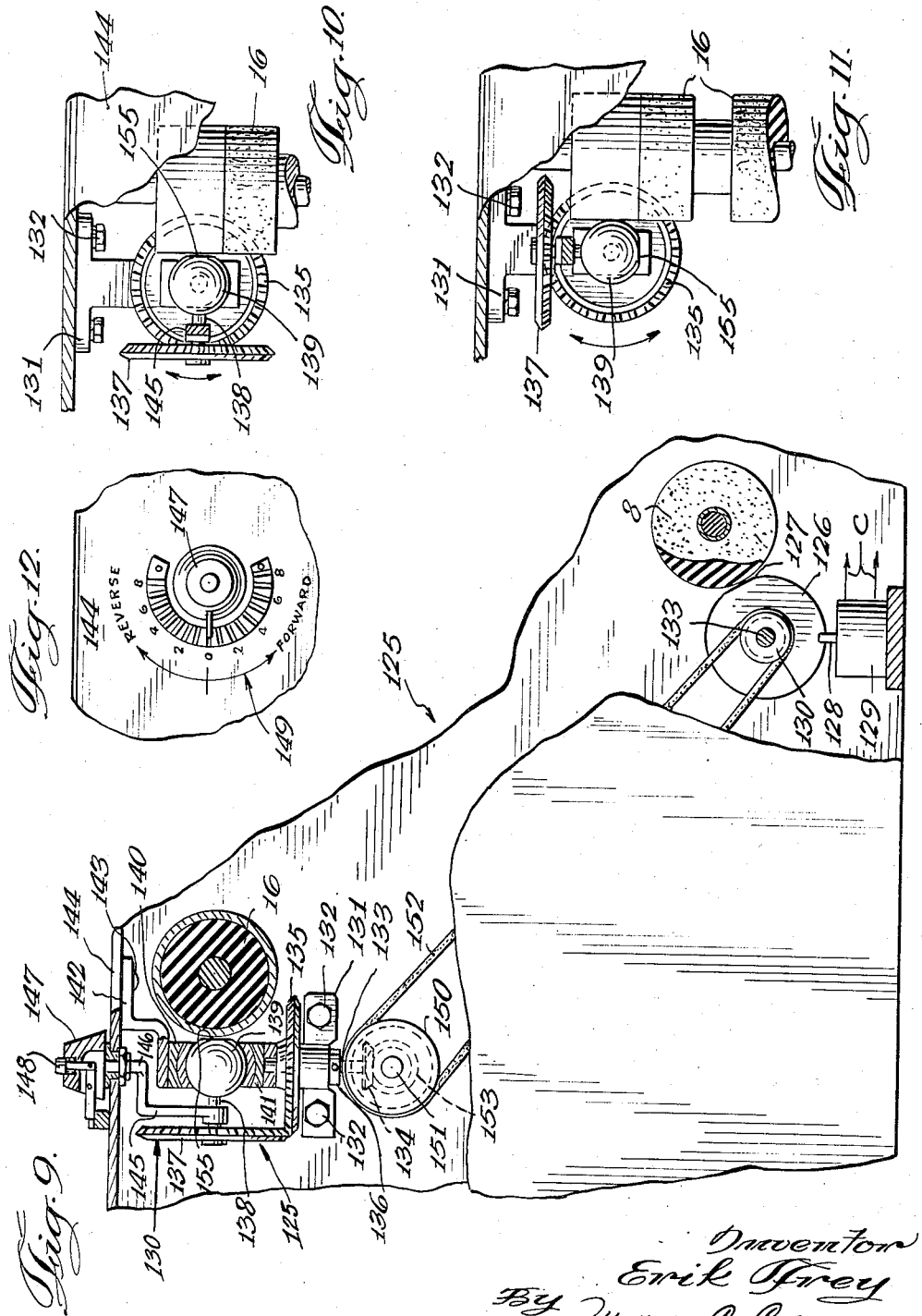

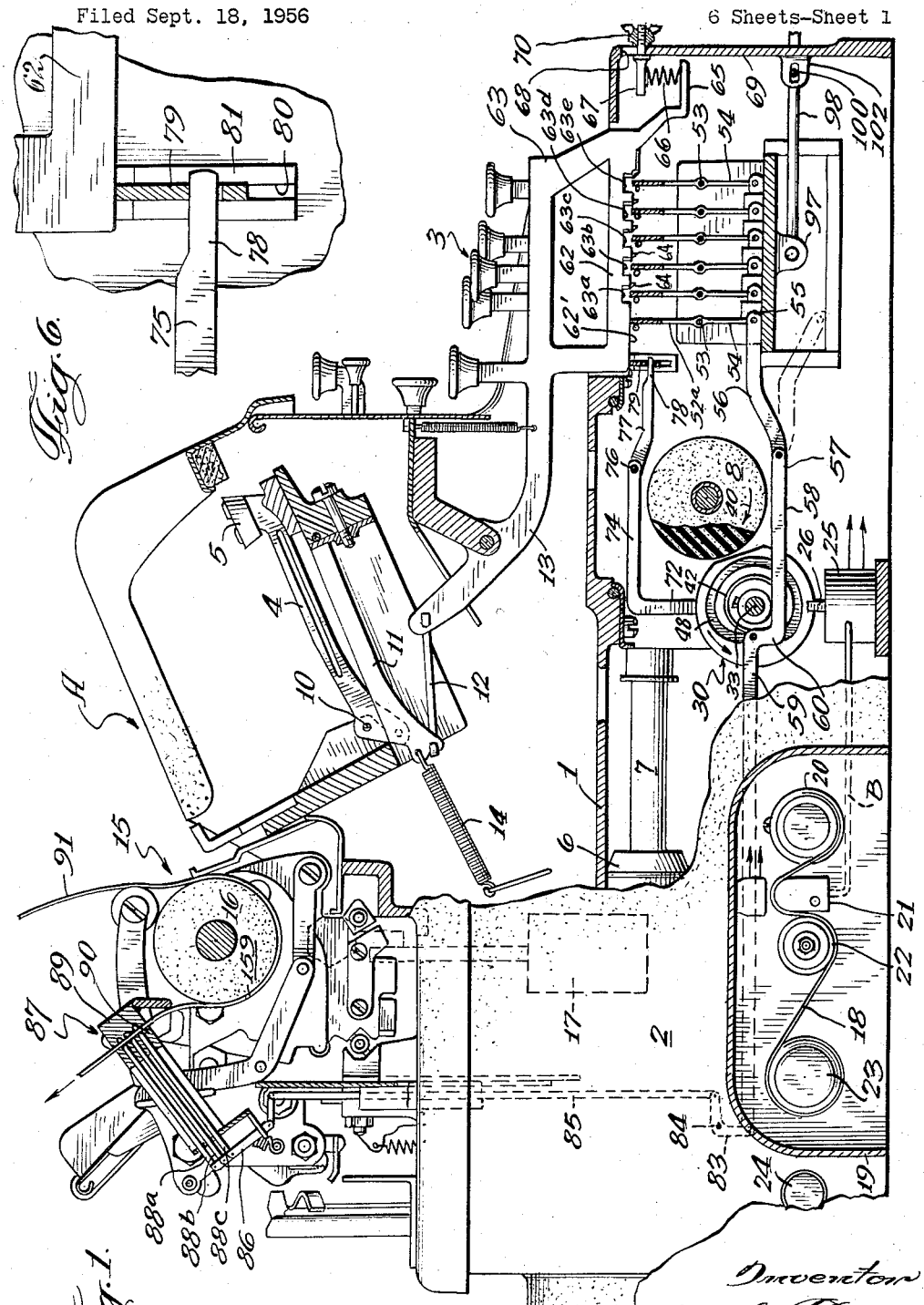

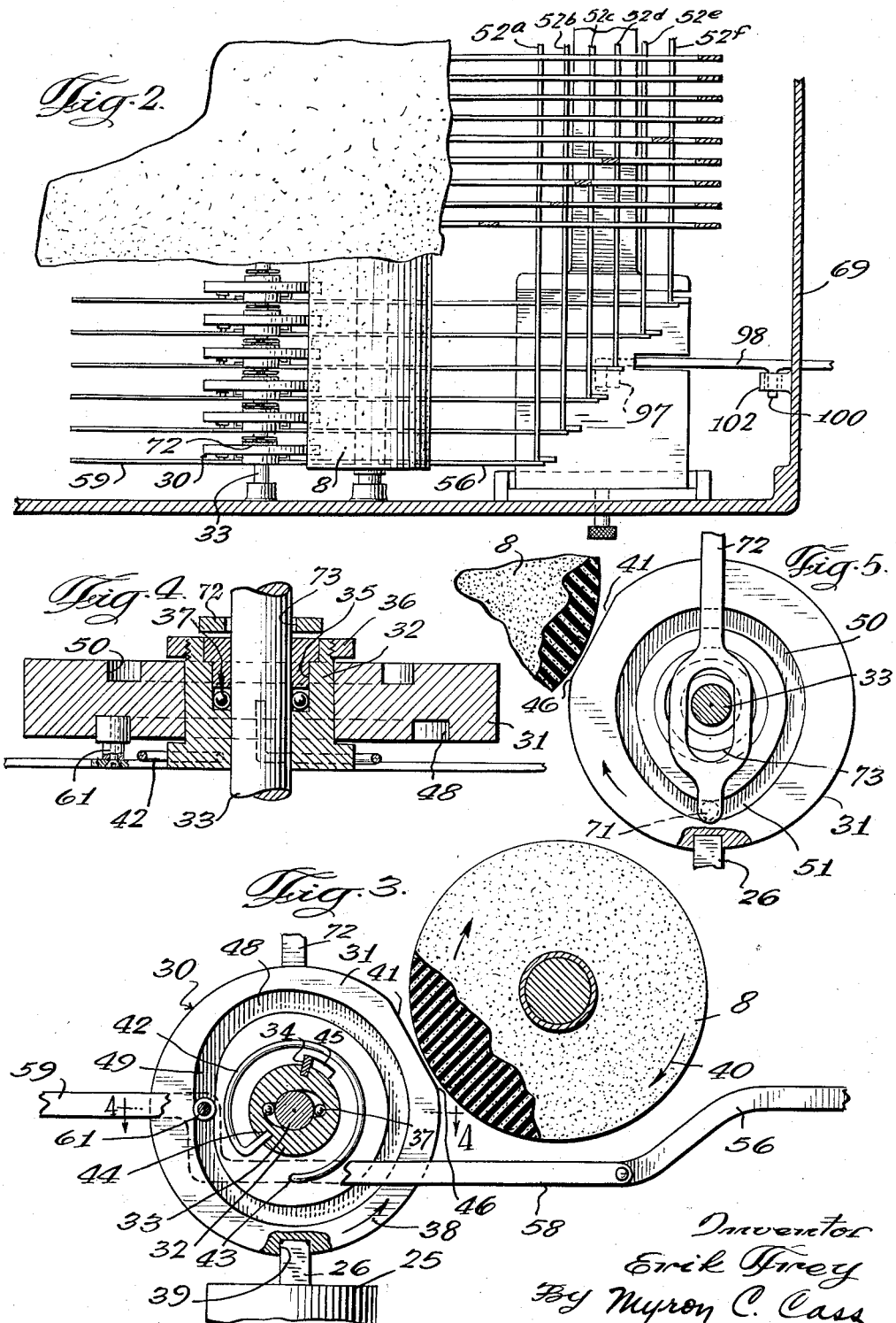

July 8, 1958 E. FREY 2,842,245
AUTOMATIC TRANSCRIBER AND COMPOSER
Filed Sept. 18, 1956 6 Sheets-Sheet 5
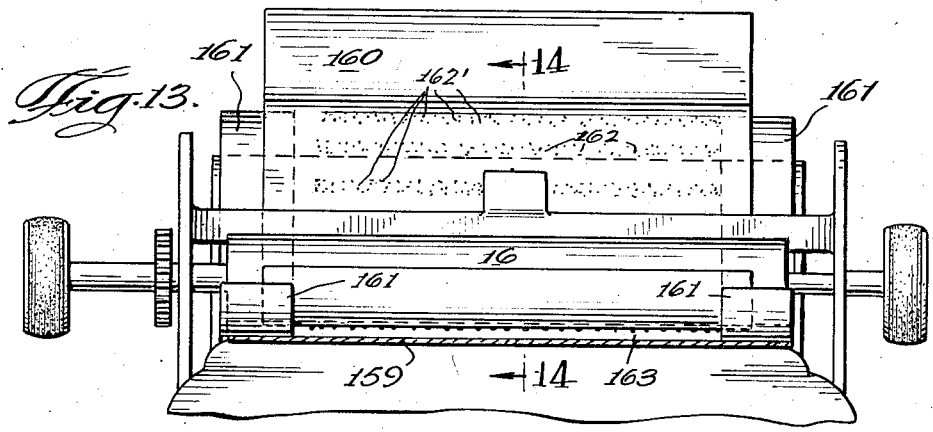
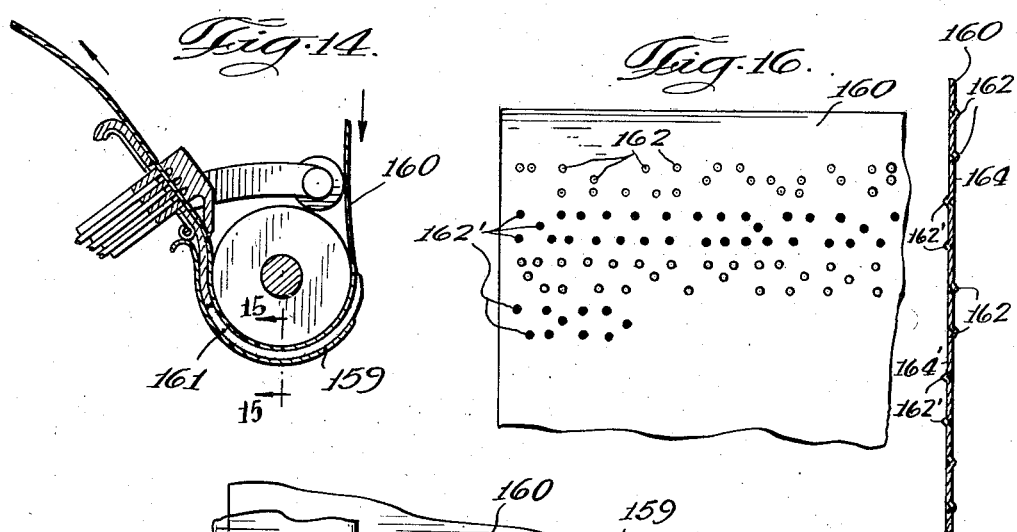
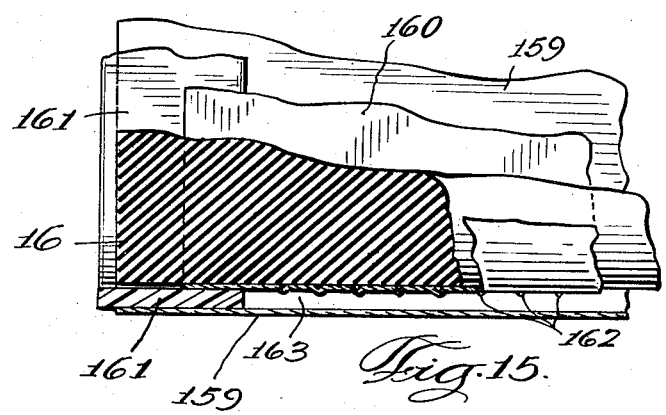
Inventor
Erik Frey
By Myron C. Cass
Attorney July 8, 1958  E. FREY  2,842,245
AUTOMATIC TRANSCRIBER AND COMPOSER
Filed Sept. 18, 1956  6 Sheets-Sheet 6
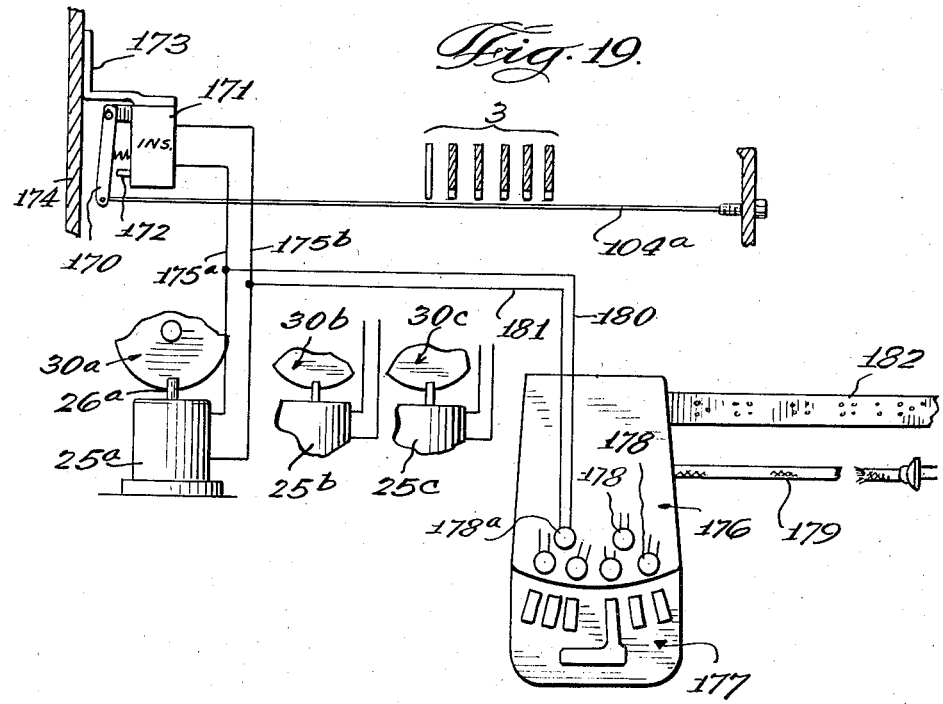
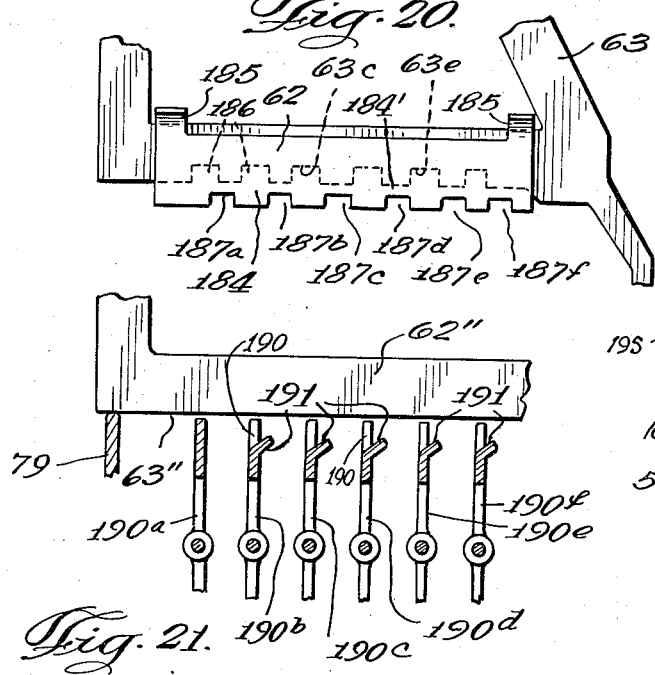
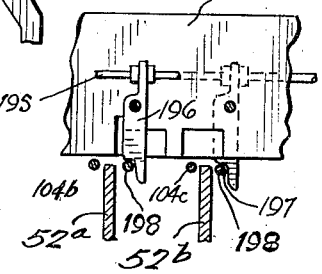
Inventor
Erik Frey
By Myron C. Cass
Attorney United States Patent Office 2,842,245
Patented July 8, 1958

2,842,245

AUTOMATIC TRANSCRIBER AND COMPOSER

Erik Frey, Chicago, Ill.

Application September 18, 1956, Serial No. 610,488

18 Claims. (Cl. 197—20)

This invention relates to improvements in automatic motorized printing and writing machines and automatic control mechanisms therefor and more particularly, relates to providing novel apparatus suitable for operable association and combination with a motorized typewriter to enable certain special functions to be achieved with an otherwise conventional automatic typewriter.

Automatic typewriting machines are available which are operated from a record tape carrying a message or other intelligence in the form of longitudinally spaced perforations arranged in accordance with a predetermined code for the typewriter printing character or typewriter functions represented by the keys of the keyboard. The functions such an automatic machine could perform were limited by the arrangement of keys and by the automatic control mechanisms employed to selectively actuate the keys is response to the coded perforations as translated by a translating device, such as a light-sensitive cell system or a pneumatic system. Thus, in order for a keyboard to be adequate for a Linotype machine, the keyboard arrangement had to be specially provided. One of the important objects of this invention is to provide novel apparatus of the character described which can be operably associated with an automatic typewriter having a conventional keyboard to enable multiple-keyboard arrangements to be realized from only a single keyboard. An ancillary object of the invention is to provide such apparatus which will substantially eliminate the limitations heretofore inherent in the keyboard arrangement of an automatic typewriter.

An important object of the invention is to provide novel apparatus enabling the conventional automatic typewriter to function as a Braille printing apparatus as well, said apparatus capable of enabling the following general functions to be achieved:

(1) Provision of an automatic motorized Braille printing machine.

(2) Enable the automatic typewriter to write Braille code from manual depression of the key-levers of the typewriter.

(3) Enable automatic operation of the typewriter from the keyboard of a Braillewriter and vice versa.

(4) Enable automatic operation of the keyboard of the typewriter from a record tape carrying Braille code and simultaneously provide a visual copy of the Braille translated.

(5) Enabling transcribing of Braille code onto a record tape while simultaneously providing a visual copy of the Braille translated.

(6) Enable automatic writing of Braille from a record tape carrying a message or other intelligence in code other than Braille.

Another important object of the invention is to provide apparatus of the character herein described capable of operable association in an electric typewriter without interfering with or preventing normal manual and/or automatic operation of the typewriter at the option of the operator.

In achieving the novel Braille printing apparatus, it will become possible for the first time to utilize the services of blind typists who are skilled both in operating conventional typewriters and the Braille writer to a substantially greater degree in business offices and in the field of communications. Also, the Braillist, unable to operate the conventional typewriter, can be employed to operate the automatic embodying the invention to cut record tape for use in many other fields of endeavor. Notwithstanding the special benefits of the invention for the blind typist, it should be understood that the invention may be employed with great advantage for transcribing and composing languages other than Braille and as well, will be useful in the field of cryptography for scrambling and de-coding operations, for foreign language machines, Linotype, Teletype and photocomposing machines. It is another important object of the invention to permit achievement of these advantages by providing a novel key-lever selector mechanism which provides for a greater number of possible key actions, thus allowing a single keyboard to attain the functions of a plurality of keyboards.

Supplementing these broad advantages, the invention includes providing novel cooperating mechanisms which enable the following additional functions to be performed:

*a.* Reversible automatic line spacing at the option of the operator.

*b.* Variable spacing of the carriage for different type points in conjunction with multiple keyboard functions of the machine.

*c.* Imprinting of coded messages or other intelligence, especially Braille code, on both sides of a carrier sheet.

*d.* Permit variation in the keyboard of the machine as by a complete change of the basket of type.

Another object of the invention is to provide a novel electromagnetic press device capable of operable association with an automatic typewriter as modified by the apparatus forming part of this invention which enables the thusly modified typewriter to be used in record tape-making, safety embossing of checks and for embossing Braille.

Another important object of the invention is to provide novel apparatus of the character described which is comprised of simple electrical and mechanical components utilizing a small number of parts so as to be highly economical and readily serviceable; which apparatus is compact so that same may be conveniently installed in the conventional automatic machine without substantially increasing the volume of space occupied thereby.

Other important objects of the invention include providing novel mechanisms for controlling selection and actuation of key-levers in response to a predetermined code carried on the record tape passed through a translating device either on the typewriter or remote from the same; providing novel mechanisms which control and actuate both the key-levers simultaneously with the embossing bars of the Braille press attachment so as to permit imprinting of Braille characters while simultaneously providing a visual translated copy of the Braille intelligence; providing novel means for changing the escapement of the automatic typewriter so that the larger spacing required for accommodating a Braille cell can be attained.

A complete enumeration of the novel mechanisms embodying the invention and the objects capable of being achieved thereby is believed conducive to an unnecessarily voluminous specification. The objects already enumerated and others will become apparent to the skilled artisan as the disclosure is evolved. A preferred embodiment has been described in detail and illustrated in the accompanying drawings. Variation in minor details of size, construction, proportion and arrangement of parts is deemed within the skill of the artisan without departing from the spirit or sacrificing any of the advantages of the invention.

In the drawings, wherein the same characters of reference have been employed to designate the same or equivalent parts through the several figures thereof:

Fig. 1 is a side elevational view of a motorized or electric typewriter with which the apparatus embodying the invention has been combined, parts being broken away to show certain structural details.

Fig. 2 is a fragmentary top plan view of the keyboard of the typewriter with a portion broken away to show the novel automatic control means for actuating the type bar operating devices of said apparatus.

Fig. 3 is a partial elevational view on an enlarged scale of said control means.

Fig. 4 is a sectional view taken along the line 4—4 of Fig. 3 and in the direction indicated.

Fig. 5 is a partial elevational view taken from the side opposite that shown in Fig. 3.

Fig. 6 is a fragmentary elevational view showing the cam operated detent means employed to maintain the key arms in a normally raised or inoperative position.

Fig. 7 is a fragmentary side elevational view of the typewriter with a portion of the side wall broken away to illustrate the means enabling conversion of the machine to manual operation at the option of the operator.

Fig. 8 is a perspective view of the rotatable multi-sided rack employed with the carriage of the typewriter for achieving desired variable escapement spacing.

Fig. 9 is a fragmentary side elevational view illustrating the variable line spacing apparatus.

Fig. 10 and Fig. 11 are elevational views of a portion of the variable line spacing apparatus and showing the positions thereof for effecting forward and reverse line spacing respectively.

Fig. 12 is a plan view of the indicator dial positioned and mounted on the carriage for adjusting amount of line spacing.

Fig. 13 is a front elevational view of the typewriter carriage showing a sheet of paper being imprinted with Braille characters.

Fig. 14 is a sectional view taken along the line 14—14 of Fig. 13 and in the direction indicated.

Fig. 15 is a fragmentary elevational view with portions broken away to illustrate the novel means enabling imprinting of Braille on both sides of a sheet of paper.

Fig. 16 is a fragmentary plan view of a sheet of paper on which Braille has been imprinted on both sides of the sheet and Fig. 17 is a vertical section taken through said sheet of paper.

Fig. 18 is a plan view of a section of tape on which has been imprinted both Braille and visual intelligence by means of my invention.

Fig. 19 is a schematic illustration of a conventional Braille writing machine associated with the automatic.

Figs. 20, 21 and 22 are illustrations respectively of modified forms of automatic control means for operating the type bar operating devices and enabling achievement of multiple keyboard functions.

The automatic transcribing and composing apparatus embodying the invention has been illustrated operably associated with an electric typewriter A which except for my apparatus incorporated therein is intended to be of conventional construction. Conventional parts of machine A include a frame 1 encased in a housing 2, a complete set of character key-levers 3 fulcrumed for controlling a plurality of type arms 4 carrying type fonts 5, and associated functions of the typewriter, such as, character spacing, upper case shifting and locking, tabulating, back-spacing, carriage return and other familiar functions. Machine A mounts a motor 6 the shaft 7 of which is coupled to rotate a power or drive roller 8. Generally, the type-bars 4 are mounted on a common pivot 10 and connected as by toggle lever 11 to be pivoted by action of link 12 connected to the arm 13 of a character-key lever. A spring 14 connected to toggle 11 insures return to normal position of the type-bars. The particular structure illustrated to effect imprinting and return movement of the type-bars may be varied considerably within the knowledge of the prior art and hence, the structure described and illustrated is intended to be only representative of a suitable means for achieving the function of moving the type-bars in response to depression of the key-levers and for returning said type-bars to normal position.

A reciprocable carriage 15 carrying a paper feed roll or platen 16 is moved by an escapement mechanism shown diagrammatically at 17, the mechanism 17 being operated by depressing the key-levers. Power roller 8 extends transversely across the machine behind the key-levers and may be continually driven from motor 6 by suitable gearing (not shown) or a drive belt.

The typewriter A is capable of being operated automatically from a record tape 18 carrying perforated intelligence arranged in a predetermined code, such a tape being well known in the art. The tape feeding and winding apparatus which adapts the ordinary electric typewriter for automatic control from a record tape 18 may comprise an attachment secured on a side of housing 2 which includes, a case 19 for a tape supply spool 20, a tracker or translating mechanism 21, a sprocket wheel 22, a take-up spool 23 and a knob 24 for manual manipulation of the tape 18. The tape feeding and winding apparatus is operably driven from the motor 6 through suitable coupling therewith. The translating mechanism 21 comprises light-sensitive or photo-electric cells and a source of light which are arranged to register with coded perforations on the tape 18 selectively to provide an electrical output, the electrical signal output being supplied to operate electromagnetic locking devices such as the one illustrated at 25, of which there are at least six employed in the invention. The device 25 may consist of a solenoid which when energized or de-energized (this being a matter of choice) causes retraction of a release pin 26 (armature of the solenoid) to initiate (as by unlocking) a series of mechanical operations automatically performed thereafter. The electrical circuit for supplying the signal from the photo-electric cell system is well known in the art and hence has not been illustrated in detail.

The apparatus embodying the invention includes providing novel automatic controlling means adapted to be coupled to the power roller 8 for effecting depression of the key-levers 3 individually and sequentially. Said automatic control means cooperate with novel key-lever controlling elements so that automatic operation of the machine may be initiated from the record tape 18 as it traverses the translator 21. The arrangement of the perforated code on the tape causes predetermined selection of the one or combination of automatic control means designed to control operation of the key-lever controlling elements in a predetermined sequence thereby selecting the particular key-lever which is depressed for obtaining the desired character imprint or key-board function to be performed. This portion of the disclosure will be made with reference to Figs. 1 through 7.

The automatic control means are supported six in number parallel and spaced to the rear of power roller 8. Each of said control mechanisms designated 30 are identical and hence, a detailed description of one will suffice. Each includes a cam wheel 31 carried on a hub 32 rotatably mounted on common shaft 33. The wheel 31 is keyed on the peripheral surface of the hub as shown at 34 so as to be permitted slight movement relative to the hub. The hub has an increased diameter chamber 35 opening to one end thereof and which is normally closed by the cap 36 threaded thereon. Chamber 35 houses a familiar ball-clutch mechanism 37 which operates to engage the hub to the shaft only when the hub is rotated in one direction—counter-clockwise as indicated by the arrow 38, but which permits free-wheeling of the hub in the opposite or clockwise direction.

Referring to Fig. 3, shaft 33 and hence wheel 31 are arranged vertically aligned with a solenoid 25. A notch 39 is cut in the periphery of said wheel in position to receive the release pin 26 for locking the wheel against any rotary movement. The shaft 33 is linearly spaced from the periphery of roller 8 a distance slightly less than the combined radii of hub 32 and wheel 31 so that when wheel 31 engages roller 8 it will be rotated in a direction opposite to the direction of rotation of the power roller, which is clockwise as indicated by arrow 40. Wheel 31 has a segment sliced from its perimeter to provide a flat portion 41 next adjacent the roller 8 which provides a clearance area to permit the roller 8 to remain disengaged from the wheel 31 when said wheel is locked by release pin 26, as shown in Fig. 3.

A looped spring 42 is secured at its ends respectively to the wheel 31 at 43 and the hub at 44 and normally is biased to rotate wheel 31 counter-clockwise a distance permitted by the length of the key-way 45 in said wheel. When pin 26 is withdrawn, the latent energy stored in spring 42 will cause wheel 31 to rotate counter-clockwise relative to the hub 32 a short distance. This movement will displace the flat portion 41 sufficiently to effect engagement of the wheel's circular periphery with roller 8 at the extremity 46 of said flat portion first, whereupon the wheel thereafter will be driven counter-clockwise a full revolution until the flat portion 41 again returns to its original position enabling pin 26 to again engage in notch 39. When the wheel engages roller 8, the ball-clutch mechanism 37 engages with shaft 33 locking hub 31 on said shaft. Rotary movement of the shaft however will not cause angular displacement of the other mechanisms 30 also mounted thereon.

One lateral face of the wheel 31 is provided with a generally circular groove 48, however having a vertically arranged straight dwell section 49 rearwardly spaced from shaft 33 in the locked position of the mechanism 30, as seen in Fig. 3. The opposite face of the wheel also is provided with a substantially oval dwell or guideway 50 which is elongated at one pole 51 thereof. Elongated portion 51 is disposed below shaft 33 in the normal locked position of wheel 31.

The key-lever controlling elements are six in number and comprise blades vertically arranged and disposed laterally across the machine A from front to rear and below key-levers 3. The blades are parallel one to the other, each blade 52a, 52b, 52c, 52d, 52e and 52f in the embodiment shown in Figs. 1, 2 and 7, is pivotally mounted at one end 53 thereof on an upright 54 secured on the free end 55 of a link 56. Each link 56 is substantially horizontally arranged and extends rearwardly toward the mechanisms 30. The opposite end of a link 56 is pivotally connected to the end 57 of an elongate actuator bar.

The actuator rods or bars, six in number, each have a straight portion 58 and a straight portion 59 offset therefrom and connected to portion 58 by a vertical riser 60. The actuator rods each extend from front to rear of the machine A on the same side of a wheel 31, the portions 58 all being disposed in front of shaft 33 and the portions 59 all being disposed to the rear of said shaft. At the juncture of riser 60 and portion 59 of a said actuator bar is provided a cam follower pin 61 which is engaged in the dwell 49 of an adjacent wheel 31 in locked position.

When a release pin 26 is withdrawn, spring 42 causes engagement of its associated wheel 31 with roller 8, whereupon the wheel is rotated counter-clockwise. The cam follower 61 will then ride up the dwell portion 49 and onto the circular dwell 48 thereby causing the bar 58 to be translated toward the rear of the machine A or toward the left as viewed in Fig. 1 carrying along with it the link 56 on which post 54 is secured. The blade associated with said post 54 will be pivoted in a direction opposite to the direction of movement of the link 56 or clockwise. Upon return of the wheel 31 to its locked position engaged by release pin 26, the blade will have returned to its normal erect position. The movement and return of a blade is accomplished during each complete revolution of a said cam wheel.

Each key-lever is provided with a depending horizontally arranged arm 62 so that the bottom edges 62' of each key-lever may be considered to lie in a common plane. Each edge 62' is encoded with a sequence of rectangular notches and imperforate portions which cooperate with the control blades to determine the key-lever to be depressed. The general combinations of notches and imperforate portions so that each character and keyboard function will be assigned a combination is already well understood in the art and deemed unnecessary to illustrate in full. As an example, however, illustrated in Fig. 1 is a combination of encoding for key arm 63 representing character "A" of the keyboard. The edge 62' is provided with five notches designated 63a, 63b, 63c, 63d and 63e from left to right in the order named. Depending from the edge 62' spaced immediately behind each said notch is a depending ear or lug 64. Each lug presents an arcuate face 64' toward the notch with which associated. In connection with the other key-levers, for each encoding notch there is provided a depending ear 64.

The notches and depending ears cooperate to function as key movement resisting notches. Consider Fig. 1 again, where is illustrated the blades 52b, 52c, 52d, 52e and 52f each aligned with a notch in edge 62'. However, the blade 52a is aligned opposite an imperforate portion of edge 62' and hence, the erect position of blade 52a prevents the key arm for character "A" from being depressed. However, if the cam wheel linked with blade 52a is released so that link 56 connected to blade 52a may be moved to cause blade 52a to pivot slightly, clearance will be provided to permit downward movement of the key arm, since all of the other blades are aligned with notches.

As for the other key arms, the system of depending ears operates to prevent their depression. As a blade or blades rotate, it moves along the arcuate surface of a depending lug of each of the other key arms and prevents the other key arms from being depressed by engaging against said surface. Since the depending ears will be arranged in laterally spaced rows across the bottom of the keyboard and the blades reach across below the key arms, it will be possible to so arrange the depending ears that only one key lever can be depressed at a time even though more than one control mechanism 30 has been released in response to a coded perforation.

The encoding system of notches and depending ears conform to what may be called a "six point system" in that there are six control mechanisms 30 and six control blades. This correlates with Braille which also is a "six point system" in that there are six positions for each dot which is possible. Thus, the notches on the key arms also can be correlated to Braille. Generally, the lever for character "B" will have four notches and depending ears, the lever for character "D" will three notches and ears and so on all correlated to the number of dots for the corresponding Braille character. The arrangement of the notches and depending ears may be varied on the bottom edges of the key arms to achieve the necessary combinations for all characters. The system of encoding may be varied as desired, however, the depending ears will effect resistance to depression of all but one key lever at any one time.

Referring again to Fig. 1, each key lever is provided with depending ledge member 65 arranged in a common plane. The ledge members are normally biased downwardly by means of a coil spring 66 supported on a plate 66' resting across the ledge members and secured to the stud 67 extended through a vertical slot 68 in front wall 69 of the typewriter. The protruding end of said stud mounts a wing nut 70 (Fig. 7). Thus, the key-levers are normally biased in a direction effecting depression thereof. However, to withdraw the biasing effect of spring 66, nut 70 may be loosened and the stud 67 raised in its position in the slot 67. Relieving of the biasing effect of spring 66 enables manual operation of the machine. Of course, during automatic operation, the spring 66 is positioned to effect downward biasing of the key arms.

When the typewriter A is operated from the record tape 18, the key-levers normally are maintained spring-biased toward a depressed position. However, automatic detent means which are cam operated are provided to prevent downward movement of the key-levers at all times except when one or a combination of control mechanisms has been actuated in response to the code on the record tape. At this time the automatic cam operated detent means is released from all the key-levers so that the particular key-lever or key-levers selected to be depressed may be spring-biased to move downwardly. The automatic detent means are operated from the dwell 50 of a said cam wheel. As seen in Fig. 5, a cam follower pin 71 carried on the lower end of a vertical arm 72 is engaged in cam dwell portion 51 when the cam wheel 31 is engaged by release pin 26. The arm 72 is enlarged adjacent its connection in dwell 51 and said enlarged portion has a vertical slot 73 through which shaft 33 may clear. The arm 72 is L-shaped, the second leg 74 thereof extending horizontally and toward the control elements or blades. Each mechanism 30 is provided with a lever 72, the leg 74 of which is connected at its free end by a pin 76 to a link 77 which extends to a point below the key-levers and supports on its end 78 an upright elongate detent member 79 (see Fig. 6) designed to ride in a vertical guideway 80 provided in plate 81 supported on the interior of the housing. The detent 79 normally engages the bottom edge 62' of each arm 63 and prevents depression of said levers 3.

The lever 72 is normally maintained by the pin 71 engaged in dwell 51 in its lowermost position relative to shaft 33. However, when a release pin 26 is withdrawn so that its associated wheel 31 is rotated counter-clockwise, pin 71 will ride around the dwell 50, which by reason of its configuration will cause the arm to be elevated. As seen from Fig. 1, the link 77 will then be depressed and thereby lower detent 79 from its normal position holding key-levers upward against the bias of spring 66. The sequence of timing is designed to relate with achievement of full alignment position by the control blades with the notches of one lever 3, however, when detent 79 is withdrawn, all the key-levers are free to be depressed. However, as explained, only the key-lever whose notches are aligned properly with the control blades will be free to be depressed by spring 66.

Referring again to Fig. 1, the control mechanism 30 seen therein, not only effects linear movement of the bar 58 but also, and simultaneously, effects linear movement of bar 59. As the bar 58 is moved to the left, the bar 59 will be moved to the left simultaneously as the pin 61 rides the dwell portion 48. Bar 59 is pivotally connected at its free end to one arm of a bell-crank lever 83 which is pivoted at its center on pin 84. The second arm of lever 83 is pivotally connected to one end of elongate rod 85, the opposite end of rod 85 being pivotally connected to a bell-crank lever 86. Bell-crank 86 is pivoted to one of six embossing rods of an electromagnetic Braille press attachment designated generally 87. Each bar 59 is in the same manner kinematically linked between a mechanism 30 and a said embossing rod, three of which are illustrated at 88a, 88b and 88c in Fig. 1.

The Braille press attachment 87 is mounted on the frame of the machine by suitable brackets and fasteners beneath the paper table thereof. Same preferably includes a housing open at the bottom end thereof to permit connection with the embossing rods without interfering with other mechanisms of the machine. The attachment 87 carries an electromagnet 89 provided with a depressed seat into and out of which the embossing ends of the embossing rods are reciprocated. A flat ferrous metal member 90 is positioned opposite the seat in said electromagnet 90 and the sheet of paper 91 is moved between member 90 and magnet 89. Thus, when an embossing rod is moved into the seat of the magnet behind the sheet of paper and current supplied to the magnet, the iron member 90 is drawn against the magnet and the raised characters on the embossing rods are impressed on the facing surface of paper 91.

Braille code is comprised of sixty-three combinations of embossed dots. The six point control system provided by this invention enables the embossing of Braille on a sheet 91 simultaneously with providing a visual copy translating the Braille also on said sheet. Each Braille character is equivalent to a character of the alphabet to be imprinted by depression of a key-lever 3. The various Braille combinations capable of being effected by the embossing bars are each correlated with the encoding system on the key arms and/or the control blades so that simultaneously with imprinting of a particular character by a type-bar 4, the corresponding embossing bars are moved to achieve embossing of the corresponding Braille cell on sheet 91. This is possible since the bar 59 moves simultaneously with the bar 58 to which it is linked and movement of bar 58 selected to pivot a control blade in response to a signal from the translating device.

It should be considered that operational movement of the embossing bars also could be effected through individual electromagnetic devices, such as solenoids, having an armature connected to the embossing bar. Suitable circuits would be provided which connect such solenoids to the control mechanisms or locking devices to achieve energization of solenoids selectively, thus controlling the embossing bar brought into position for embossing. This has not been shown, as likewise has not been shown the electrical circuits since they are believed sufficiently known to be provided following the functions desired as described above.

In order to permit Braille and visual copy to be imprinted concurrently, adequate escapement for accommodating a Braille cell must be provided since a Braille cell is wider than the corresponding alphabetical character it represents. This will be discussed in connection with Fig. 8 of the drawings. However, it may be pointed out that the invention provides for increased escapement so that Braille cells may be accommodated with the conventional escapement mechanism 17.

Automatic operation of machine A from a record tape 18 should now be apparent. The tape 18, bearing a predetermined message represented by longitudinally arranged coded perforations traverses the translating system 21 and in response to the coded perforations on the record tape will provide an output carried by electrical leads B to a particular solenoid 25 or combination of solenoids. One or a combination of solenoids 25 will be energized to cause withdrawal therein of associated release pin 26. The cam wheel or wheels thus released will be caused to rotate a full revolution. One function accomplished will be the alignment of the proper blade or blades with the notches on the underside of the key-lever required to be depressed corresponding with the coded markings on the record tape which initiated the output from system 21. The other function will be the actuating of a Braille embossing bar on bars, the particular embossing bars actuated being capable of reproducing on a sheet of paper 91 or other carrier the Braille code marking corresponding to the character imprinted by the key-lever 3 which was depressed. Thus, simultaneous reproduction of the key-lever characters and Braille characters is possible.

The invention also contemplates permitting manual depression of the character key levers, in other words, manual operation of the machine A at the option of the operator. Referring to Fig. 7, it will be seen that all of the links 56 are carried on a table 95 which is reciprocably supported in a guide bracket 96 of U-shape on the interior of housing 2. Depending from the underside of table 95 is an ear 97 to which is pivotally secured rod 98. Rod 98 is extended outward through an opening in the front wall 69 and its protruding end is provided with a handle 99. The rod 98 also is pivotally connected at 100 in a slot provided in ear 102 attached to the inside surface of wall 69. For automatic operation of the machine A, the table 95 is raised to the position shown in Fig. 1 where the blades supported on links 56 will be in position to cooperate with the notches on the key levers 3 to control movement of the key-levers. For manual operation of the machine A, table 95 is lowered by raising handle 99 and locking same as by engagement in a suitable notch in the wall 69 in a well known way. The blades 52a through 52f will now be retracted, as shown in Fig. 7. It is necessary also to relieve the spring bias on key-levers 3, which is accomplished by loosening nut 70, moving the stud 67 to the upper end of slot 68 and then tightening nut 70. The spring 66 will be expanded, and hence, the normal bias of said spring 66 is withdrawn. Key-levers 3 may now be individually depressed manually by the operator. The detent 79 does not interfere with manual depression of the key-levers, however, same may be retracted also by means of a suitable lever which may be provided for such purpose, if desired. This has not been specifically shown.

Referring to Fig. 7, there is illustrated novel apparatus for enabling the Braille embossing bars to be actuated simultaneously with manual operation of the key-levers 3. Transversely supported spaced apart below the arms 63 are six cords 104a, 104b, 104c, 104d, 104e and 104f. The cord 104a is seen in Fig. 19. These cords are each connected at one end thereof to the movable arm of a microswitch which is connected in series with a solenoid 25. The precise manner of supporting the cords and connecting same to said microswitches may be understood from my co-pending application, Serial No. 591,107, filed June 13, 1956, for Carriage Moving Apparatus for Typewriters. The cords 104a through 104f are each arranged adjacent a control element or blade and thus, in duplication of the normal erect condition of blades 52a through 52f. The edge 62' of said lever 63 has the five notches 63a through 63f as previously described and only the cord 104a is not aligned with a notch. Thus, when lever 63 is depressed, the cord 104a will be engaged and moved downwardly as the key-lever is depressed. This movement of cord 104a is sufficient to close a microswitch which will energize a particular solenoid 25 and withdraw its release pin 26 from engagement with the associated cam wheel 31. The cam wheel will now be rotated in the manner previously explained so as to translate the bar 59 connected therewith linearly and thereby move a particular embossing rod to emboss a Braille code marking corresponding to the character imprinted by manual depression of character key-lever 63. Of course, the blades 52a–52f first would be placed in retracted position relative to the key-levers. Thus, by providing the six control cords 104a through 104f and positioning same relative to the notches in the bottom edges 62' of key-levers 3 in the same alignment as the blades 52a through 52f, manual operation of the Braille embossing device may be accomplished from the keyboard and concurrently with manual depression of the key levers 3.

Braille code comprises a system of six embossed dots designed to be arranged in various combinations in two vertical columns of three vertical dot positions each, the particular position and number of dots of a combination establishing the corresponding character of the ordinary alphabet. It is sufficient to understand that the distance between adjacent code markings of the same horizontal line is about ¼ inch or greater than the normal escapement distance between normal typewritten alphabet characters and hence the normal escapement mechanism of a typewriter would provide insufficient escapement distance to accommodate Braille code markings. To permit the machine A to print Braille, either automatically or manually from the keyboard thereof, there is provided a novel rack designated generally 110 in Fig. 8. The rack 110 comprises an elongate polygonal-shaped sleeve 111 fixed on shaft 112. Shaft 112 is associated with the carriage of the machine, one end 113 thereof being journalled in the end wall 114 of the carriage and the opposite end (not shown) journalled in a suitable bracket also installed on the carriage. The end 113 protrudes outwardly of wall 114 and carries an indicator collar 115 and knob 116 by means of which the rack is manually rotatable. A plurality of circumferentially spaced depressions 117 are provided in collar 115 for selectively seating therein a spring-pressed ball detent 118 supported on mount 119 secured on the exterior of wall 114 to prevent rotary movement of said shaft.

The rack 110 is illustrated as hexagonal in shape, however, the number of faces may be varied as desired. Each face is provided with spaced apart grooves therein, however, the number of grooves per unit of lineal dimension on each face differs. Thus, the face 120a has a less number of grooves 121a than the face 120b has grooves 121b on its face. The face 120c has a number of grooves 121c per unit of lineal dimension less than face 120a and more than 120b. This, of course, is achieved by varying the width of the grooves on the faces of the sleeve 11.

The rack 110 is disposed on the underside of the carriage to be engaged with the pinion 122 which is part of a conventional escapement mechanism 17. The face of the rack 110 with which pinion 122 is engaged determines the mount of escapement distance which the carriage is translated upon depression of a key-lever 3. To selected the escapement movement desired, the knob 116 is rotated to seat ball-detent 118 in a depression 117 corresponding to the particular face of the sleeve desired to be engaged by the pinion 122. For greater escapement distances, the face of the sleeve having lesser number of grooves per unit of linear dimension is selected to engage the pinion. Thus, the conventional escapement mechanism of the typewriter is employed with the multiple grooved rack 110 to achieve varying escapement distances for the carriage of the typewriter. In the case of printing Braille code, the face 120a might be selected to engage pinion 122 since for a given angular movement of pinion 122, a greater escapement distance will be provided than say, with face 120c engaged with pinion 122. The multiple groove arrangement enables the machine A to be used where the size of type-font 5 is change or varies from the conventional size type; a suitable escapement distance may be achieved on the machine merely by selecting the face of sleeve 111 to be enmeshed with the pinion 122.

In order to attain the multiple keyboard functions for machine A, it is necessary to provide for varying the vertical distance between horizontal lines of printed characters. Thus, Braille writing will require a different (greater) distance between lines than alphabet letters by reason of the greater space occupied by Braille code. Variable spacing is desirable in composing of advertising copy, for instance and also in cutting tape or safety embossing of checks. Referring to Figs. 9 through 12, apparatus for achieving such variable line spacing is designated generally by the reference character 125. Same is operated from power roller 8. There is provided a cam wheel 126 mounted on shaft 33, said cam wheel having a flat portion 127. The wheel 126 is constructed similarly to a cam wheel 31 except same has no dwells or camways in the lateral faces thereof. There is a torsion spring identical to spring 39 and a ball-clutch mechanism similar to clutch 37. In normal position disengaged from roller 8 as shown in Fig. 9, cam wheel 126 has a notch in the periphery thereof in which the release pin 128 carried by solenoid 129 is engaged. The wheel 126 has a pulley 130 supported on a lateral face thereof so that said pulley is rotated when the wheel 126 is rotated. Pin 128 may be caused to be withdrawn in response to a code marking on record tape 18, such as, when the right hand margin position of the carriage has been reached or from a return key-lever provided on the keyboard. Leads C connected with solenoid 129 carry the electrical signal to the solenoid for energizing same selectively.

The platen propelling mechanism is designated 130 and is supported on the interior of the housing 2 by a bracket 131 secured, as by threaded bolts 132. Said mechanism 130 includes a vertical shaft 133 having gear 134 fixed on the bottom end thereof, the upper end of the shaft carrying a horizontally arranged circular gear 135. Pillow blocks 136 support shaft 133 in the bracket 131. Meshed with gear 135 is a vertically arranged circular gear 137 fixed on shaft 138, said shaft 138 mounting friction drive member 139 of substantially spheroid configuration retained in top and bottom bearing members 140 and 141 respectively. The bottom bearing member 141 is supported by shaft 133 protruding beyond gear 135. The upper member 140 is supported by a bracket 142 secured as by fastener 143 to wall 144 of the housing. Connecting with shaft 138 is a lever 145 having an arm 146 protruding outwardly of wall 144 through a suitable opening therein, the protruding end of arm 146 mounting an indicator knob 147. A releasable lock device 148 is associated with knob 147 for locking same in any position selected with respect to the markings of a scale 149 provided on the exterior face of wall 144 over which knob 147 is designed to pass.

The motive power for operating apparatus 125 is obtained from the roller 8 by coupling pulley 130 with a pulley 150 supported on shaft 151. The pulley 150 is coupled by the drive belt 152 and mounts a gear 153 on the interior lateral face thereof which is meshed with gear 134. Thus, rotation of pulley 150 also will result in rotation of gear 137 through meshed gears 135 and 134 carried on shaft 133, and in turn, rotation of friction drive member 139.

The member 139 is formed of a material, such as hard rubber, or a composition, which when engaged with platen 16, also a rubber member, will frictionally propel or drive platen 16. The amount of angular displacement of platen 16 will depend upon the angular disposition of member 139 relative to the platen, which angular disposition is adjustable by means of knob 147. Member 139 has a segment sliced from its periphery providing flat portion 155 thereon. Referring to Fig. 9, the position of ball 139 with the flat portion 155 opposite platen 16 so that ball 139 as disengaged from the platen corresponds to the zero position on the indicator scale 148 seen in Fig. 12. In zero position, the member 139, when rotating, will not engage, and hence, will not drive the platen 16. The zero or at rest position of the ball member 139 also is seen in Fig. 10. If the knob 147 is moved along the scale 149 indicating forward movement, the flat portion 155 will be displaced in one direction and a point on the circular periphery of ball 139 will contact the platen since the gear 137 is free to move along the circular gear 135. The area of the circle prescribed on the periphery of sphere 139 by movement of the point of contact of said sphere with the platen over said area will determine the amount of angular displacement of the platen. Thus, the ball 139 may be adjusted in relation to the platen to establish different points of contact thereon with the platen and thereby vary the angular displacement of the platen for a complete revolution of the ball. As the scale indicates, the platen may be moved forward or backward depending on which side of the axis of the ball 139 (which is coaxial with axis of shaft 138) contact of the periphery of ball 139 with the platen is made. The withdrawal of release pin 128 will effect one complete revolution of ball 139 at all settings thereof relative the platen. The operator need only set the angular displacement of platen 16 desired, either clockwise or counter-clockwise for varying the amount of space between typewritten lines, either upward or downward. A full movement of the platen in one direction is indicated by the position of ball 139 in Fig. 11, and of course, the ball may be moved to the opposite full movement position by means of knob 147.

During automatic operation release of pin 128 is controlled from the record tape. For manual operation, a suitable switch operating means may be associated with the return key-lever which when depressed will effect release of pin 128. The setting of knob 147 on dial 149 regulates the amount and direction in which platen 16 is rotated. Thus, where particular line spacing distances are desired, such as in composing for a variety of type points or Braille, the machine is readily adjustable to provide such desired line spacing. The variable line spacing functions would be useful in cutting tape also where the carriage would be locked against escapement movement and the tape passed over platen 16 and moved thereby. This is seen in Fig. 18 where a section 166 of tape is shown. The spacing between code markings 167 is relatively large, but is selectively achieved by suitable setting of control knob 147. In fact, the translated alphabet characters may be inserted between said markings 167, as illustrated. The apparatus also would be valuable for safety embossing of sheets of checks passed through machine A where even greater spacing between lines is necessary. Again, knob 147 may be set to achieve such line spacing.

In the conventional carriage apparatus, the surface of platen 16 is spaced from bed 159 (see Fig. 1) a distance normally insufficient to provide clearance for embossed Braille characters. Thus, if a sheet of paper 160 having Braille code embossed thereon were passed between platen 16 and bed 159, the embossing would be flattened. Since machine A will be adapted also to function as a Braille writing apparatus, there is provided means for preventing such flattening out of the Braille code. Also, said means enables Braille to be embossed on both sides of a sheet of paper 160. Referring to Figs. 13 through 17, I provide a pair of flexible sheets 161, such as plastic, which are relatively narrow, each sheet 161 being substantially thicker than the height of an embossed Braille character 162. Each sheet may be inserted between platen 16 and paper table 159 adjacent an end of the platen whereby to provide a pair of shoulder formations having clearance space 163 therebetween and the platen and paper table. This is possible because the table will shift slightly to accommodate the increased thickness of sheets 161. As seen in Fig. 15, the Braille code is accommodated in said space 163 when sheet of paper 160 is passed between sheets 161 and platen 16 with its marginal edges supported on said sheets 161. The platen may be turned to move the paper without interference.

Referring to Fig. 17, it will be seen that after Braille has been imprinted on one side 164 of paper 160, the sheet of paper may be inverted and Braille characters 162′ imprinted on the opposite surface 164′, albeit alternating with the rows of Braille characters 162 on side 164. Thus, there is achieved substantial economy, but in any event, the Braille code cannot be flattened or crushed when the paper 160 is passing between platen 16 and bed 159.

The typewriter A, as modified, is especially suitable for effecting operation of a Braille writer located remote from the typewriter and vi:e versa, namely, operating the typewriter from a Braille writer. The diagrammatically illustrated system in Fig. 19 is referred to for this portion of the discourse. A group of key-levers 3 are shown overlying a control cord, such as 104a, which is connected at one end to the movable contact 170 of a micro-switch 171 normally spaced from contact 172. The microswitch is supported by bracket 173 on a side wall 174 of the housing. As explained, six such cords are so provided, each connected with a normally open microswitch. Each microswitch is electrically connected to a said solenoid 25. Thus, illustrated is switch 171 connected by leads 175a and 175b to a solenoid, designated 25a in Fig. 19. Accordingly, solenoid 25b will be connected by leads to a switch 170 and solenoid 25c will be connected likewise to a said switch. Each solenoid is arranged to control operation of a mechanism 30, and this has been shown by mechanisms 30a, 30b and 30c. A Braille writer 176 is illustrated capable of being operated by my typewriter.

The Braille writer 176 essentially is conventional in that same has six embossing rods responsive to depression of the levers of keyboard 177. I incorporate into writer 176 six solenoids 178, each solenoid connected to be energized respectively when a key-lever is depressed. The solenoids 178 are all connected across a source of power by means of a line 179 which may be plugged in to the source. Also, each solenoid 178 is tapped into the circuit of a said solenoid 25. This is illustrated with solenoid 178a connected by leads 180 and 181 to leads 175a and 175b respectively between a switch 171 and solenoid 25a. Thus, when solenoid 25a is energized either during operation of the machine A from a record tape, or by depression of cord 104a during manual operation of the machine A, solenoid 178a also will be energized. Solenoid 178a may be linked to actuate the embossing bar or bars which will reproduce the character resulting from operation of mechanism 30a. The same predetermined relationship is adhered to for all the embossing bars of writer 176, so that writer 177 may reproduce in Braille on tape 182 the same intelligence being imprinted by machine A or the Braille press device 87.

Reverse operation also is possible. Thus, by depressing the keys of keyboard 177, selective energization of a solenoid or solenoids 178 is accomplished, which, in turn, will energize the solenoid or solenoids 25 connected therewith. The mechanism or mechanisms 30 thereupon released will control selective depression of the key-levers of the machine A and/or the embossing bars of device 87. Thus, writer 176 may be operated from the machine A and also, machine A may be operated from writer 176. Also, writer 176 may operate only device 87.

It may be desirable to change the encoding arrangement of notches 104a to 104f as shown in Fig. 7 so that a different encoding system is obtained. To achieve this, there is illustrated in Fig. 20 a cap 184 which may be manually attached by means of clip arms 185 on the arm 62 of a key-lever for changing the encoding system. The cap 184 has a horizontal portion 184' the upper edge of which is provided with rectangular lugs 186 so arranged that each lug can enter one of said notches 104a through 104f when the cap is installed. The opposite edge has a different arrangement of notches 187a through 187f so that a different encoding system is obtained. The encoding attachment 184 which will be used for each key arm makes it posssible to use machine A for scrambling messages in cryptography or achieving a different keyboard arrangement with the keyboard built into the machine. Other uses as well will occur to the skilled artisan.

Illustrated in Fig. 21 is another system for controlling selection of the key-lever to be depressed during automatic operation of the machine. This system is instrumental in enabling multiple keyboard advantages to be achieved from a single keyboard arrangement. Represented here is key arm 62" whose bottom edge 63" is straight, or imperforate. All of the key arms will be of this type. The same cam controlled detent 79 is employed to key the key levers elevated against spring tension and the same mechanisms 30 and connecting linkages are employed. Instead of control blades 52a through 52f, pivotal control combs designated 190a through 190f respectively are used. There are six such combs and each comb has a series of slots 190 cut therein opening to the upper edge toward the key arms. Each slot is provided by striking a narrow section 191 from the body thereof, said section thereafter being bent relative to the body of the comb from which struck to comprise an upwardly angulated tooth. Thus, the combs may be selectively pivoted, in the same manner as blades 52a through 52f were, so that there is a tooth 191 always opposing depression of a key arm not desired to be depressed whereas the key lever selected to be depressed will be unopposed by a tooth of a said comb. The key lever selected to be pivoted downwardly can enter notches of the combs not pivoted by action of the control mechanisms.

It is possible to accommodate more than one system of notches or slots and teeth on the combs 190a through 190f. Thus, two or more notches and accompanying teeth may be provided laterally spaced apart and means may be provided for laterally shifting said combs so that a particular set of notches or slots and accompanying teeth is aligned with the key arms. Thus, more than one system of encoding combs may be achieved with but just six combs. Of course, the battery of combs can be mounted for being retracted so that the typewriter A can be operated manually. Also, it is contemplated that such a system of control combs may be installed on a spindle which is rotatable to position the particular encoding set desired. Also, the system of control combs may take the form of different combinations of six combs arranged to be individually shifted to proper position for controlling depression of the key levers.

The system described in connection with Fig. 21 enables the encoding control apparatus to be varied so that different keyboard arrangements can be achieved with the single keyboard built into the machine merely by varying the code on the record tape. Thus, selecting a different encoding system would enable the machine to scramble and decode cryptic messages.

Referring to Fig. 22, there is illustrated another modification in the apparatus embodying the invention which is useful in connection with manual operation of the machine. As explained, the machine A can be manually operated from the keyboard and simultaneously operate the Braille attachment 87 by means of the cords 104a through 104f. It will be appreciated that a code cutting attachment may be substituted for attachment 87 which instead of embossing may have cutting arms for acutally perforating a carrier, such as a record tape. A specific embodiment has not been illustrated since it may be understood from the description in connection with operation of attachment 87. Where a tape cutting attachment is employed, it may be desired to cut the tape in a code different than the system predetermined by operation of cords 104a through 104f. In Fig. 22, there is shown means for achieving this, said means comprising a rod 195 secured along a face of each key arm 62 on which are supported one or more depending lugs 196 at predetermined spaced intervals. Each lug has a shoulder 197 spaced from its free end and beneath the shoulder is arranged a cord 198. Six such cords are provided and each is connected to a micro-switch in the same manner as cords 104a through 104f, however, the micro-switches control energization of different solenoids 25 than are controlled by cords 104a through 104f. Thus, when a key arm 62 is depressed, a depending lug 196 thereon will depress the cord 198 engaged thereby to energize a solenoid 25 and initiate operation of a cam mechanism 30. The particular arrangement of lugs 196 will depend on the system desired to be achieved for selection of the cutting bars of the code cutting attachment to be actuated. It will be appreciated that the Braille attachment may also be employed with this modification.

This modification lends itself to improving manual operation of the automatic for cutting record tape or writing Braille in another important respect. Instead of six cords 198, three only may be supported beneath the key arms. Each key arm has three depending lugs similar to lug 196, however, each lug is provided with a pair of vertically spaced protruding abutments or shoulders so that when the key arm is depressed, the cord will be pulled twice, namely, once each time by each abutment, to close a micro-switch and energize a mechanism 30. The pair of abutments function for a full signal. The three lugs having the abutments arranged in a suitable encoding system could write Braille or cut record tape. Such a three point system could be used for operating the machine as a Teletyper or as a regular typewriter, receiving the signals from the record tape. By adding another cord to make four in number, the system could be used for Linotype and an IBM card system which respectively are seven and eight point systems. This achieves economy of frequencies of transmission, doubling the transmission capacity to two messages instead of one, normally used.

It will be appreciated that instead of the cords, a photoelectric cell system could be employed to achieve the same results. Adjacent the type font 5, each key arm is coated with a particular color and a photo-electric cell system is arranged to be intercepted by the key arm as it moves to imprint position upon depression of the key lever. The intensity of reflected light for each such color could be utilized to provide different signals for operating the solenoid mechanisms 30 selectively.

In conclusion, it should be pointed out that although not specificallly illustrated, provision would necessarily be made for capital shifting, that is, holding the cap key down for typing upper case characters. In other automatic machines, a special signal is employed to control operation of the capital shift lever. This invention does not require this since all that is necessary is to enable the key arm of the capital shift to clear the control blades. This may be done by means of cutting a notch in the bottom edge of the key arm sufficient to clear all the blades and provide a second capital shift key arm disposed side by side with the first capital shift and capable of effecting capital shifting without interfering with the control blades.

Although the machine A has been described as having a six point or blade system for controlling the forty odd keys of a conventional keyboard, the control system is readily adaptable to encompass other control systems as well. For instance, instead of six blades operating, only five may be operated to enable the machine A to operate as a Teletype machine. Also, seven blades may be installed, including seven control mechanisms 30 and associated linkages for enabling the machine A to function as a Linotype machine, after suitable changes in the keyboard thereof. Thus, the machine A is capable of being built to encompass all of these keyboard systems in a single machine.

By providing the key levers 3 each with a downwardly extending horizontal arm 62, sufficient pitch for the key lever can be obtained to operate a non-electric keyboard. The power roller 8 could be rendered inoperable and means provided for pulling the key arms down directly in a predetermined sequence such as by an eccentric magnetized shaft (not shown) disposed beneath the key arms. Consequently, the typewriter would supply its own power.

It is believed that the invention has been described in sufficient detail to enable the skilled artisan to understand and practice the same.

What it is desired to claim by Letters Patent of the United States is:

1. In an automatic electric typewriter in which a record tape traverses a translating device to provide electrical signals by means of which individual key levers are sequentially depressed, said typewriter having a source of rotary power and key levers normally urged toward a depressed position, apparatus responsive to said signals for initiating depression of the key levers comprising, in combination, a plurality of elongate, pivotal control members supported transversely below the key levers and spaced apart one from the other, a plurality of rotatable cam devices each normally disengaged from the rotary source and including a kinematic linkage connecting the device to a said control member adapted to be translated to pivot the control member when the cam drive is rotated, a plurality of electrical locking devices each connected to said translating device for receiving a said signal to unlock same, each locking device normally being coupled to a said cam device to prevent rotation and engagement of the cam device with said rotary source, means on each cam device adapted to move the cam device into engagement with the rotary source when the associated locking device is unlocked, a cam operated detent member operably connected with each cam device and arranged normally to engage and maintain the key levers elevated, albeit adapted to be automatically withdrawn to permit depression of a key lever when a cam device is rotated, said key levers having encoding thereon of predetermined relation to cooperate with said control members to effect depression of individual key levers responsive to the signal supplied by the translating device, the key lever permitted to be depressed being determined by the particular control member pivoted.

2. The combination as described in claim 1 in which there is an electromagnetic Braille press apparatus including six embossing bars attached on the typewriter and connected to the source of power for the typewriter, each cam device has a second kinematic linkage connected to a said embossing bar adapted to be translated to move the bar into position for embossing upon energization of the Braille apparatus simultaneously with translation of the first linkage of the cam device when the cam device is rotated, the bar and key lever thereupon moved being related such that the Braille character imprinted corresponds to the visual character imprinted.

3. The combination as described in claim 2 in which there is another such cam device having a linkage adapted to be translated when the cam device is rotated and another such locking device associated with the said other cam device, and adjustable rotary drive means connected to be driven by the linkage of the other cam device when the other cam device is unlocked, said drive means being engaged with the platen of the typewriter for selectively rotating same when the drive means are rotated and adjustable relative to the platen to effect rotation thereof in opposite directions.

4. The combination as described in claim 2 in which there is a mechanical Braille writer having key-levers, an electrical circuit connected between said Braille writer and each of the locking devices including means for closing said circuit selectively upon manual depression of a key lever of said Braille writer to unlock a said locking device to effect rotation of its associated cam device, whereupon the key-lever of the typewriter depressed will imprint a character corresponding to the key lever of the Braille writer depressed and simultaneously move a said embossing bar to imprint a Braille character corresponding to the Braille character imprinted by the Braille writer.

5. The combination as described in claim 4 in which said electrical circuit includes means for automatically selectively moving each of the key levers of the Braille writer to imprint position, whereupon the visual character imprinted by the typewriter may be duplicated by the Braille writer.

6. The combination as described in claim 2 in which said control members and detent member are adjustably installed for movement to an inoperative position relative to the key-levers to permit manual operation of the typewriter without interference therefrom.

7. The combination as described in claim 2 in which said control members and detent member are adjustably installed for movement to an inoperative position relative to the key-levers to permit manual operation of the typewriter without interference therefrom, and a second control member is disposed adjacent each first control member in registry with said encoding and operably connected to close a switch connected in series with a said locking device whereupon during manual operation of the typewriter said second control members may be selectively actuated to close said switches to effect release of the cam devices in predetermined sequence related to the key-levers of the typewriter depressed to operate the Braille press apparatus simultaneously to provide a Braille copy.

8. The combination as described in claim 2 in which said typewriter is provided with a multi-faced rack secured to the carriage operably associated with the typewriter escapement mechanism, each face of the rack having teeth of different pitch, at least one face having teeth of pitch calculated to effect carriage escapement sufficient to accommodate the width of a Braille cell imprinted by the said Braille apparatus.

9. The combination as described in claim 2 in which said control members comprise elongate blades and the encoding comprises notches spaced apart in the bottom edge of a said key-lever in predetermined registry arrangement with the blades and a depending abutment adjacent each notch having an arcuate face along which a blade may pivot whereby to selectively prevent depression of all the key-levers except the particular key-lever which will be responsive to the signal from the translating device.

10. The combination described in claim 2 in which said encoding system comprises said key-levers having an imperforate horizontal bottom edge presented to the control members, said control members having a system of slots in the upper edges thereof and angularly disposed projections adapted to be arranged upon pivoting of a said control member or members in response to said signals to prevent depression of all key-levers except the one responsive to the signal from said translating device.

11. The combination described in claim 10 in which said control members have a plurality of encoding notch systems thereon, including said projections, said control members being displaceable to selectively dispose each encoding system in proper alignment with the key-levers for controlling depression thereof in response to said signals.

12. The combination as described in claim 2 in which said cam devices each include a substantially circular wheel having a slice cut from the circumference thereof of sufficient dimension to provide clearance of the wheel from the drive roller in said locked position of the cam device, said wheel having guideways in each lateral face thereof, said first and second linkages having a common follower adapted to ride in a common one of said guideways and the detent member having a connecting link operably disposed to ride in said other guideway, whereupon rotation of the cam wheel effects translation of the linkages and operation of the detent simultaneously.

13. The combination as described in claim 3 in which said rotary drive means comprises a substantially spheroidal body of friction material fixedly mounted on one end of a shaft, and said shaft is connected at its opposite end to be rotated by said linkage of the other cam device thereby rotating the said body, said shaft being arranged with its axis horizontal and coinciding with a diameter of the body, the shaft and body together being adjustable relative to the longitudinal axis of the platen whereupon the point of contact of the body with the platen may be selectively disposed on opposite sides of the diameter of the body.

14. The combination as described in claim 2 in which said cam devices each include a substantially circular wheel having a slice cut from the circumference thereof of sufficient dimension to provide clearance of the wheel from the drive roller in said locked position of the cam device, said wheel having guideways in each lateral face thereof, said first and second linkages having a common follower adapted to ride in a common one of said guideways and the detent member having a connecting link operably disposed to ride in said other guideway, whereupon rotation of the cam wheel effects translation of the linkages and operation of the detent simultaneously, said means on the cam device comprising a looped spring, said wheel being mounted on a hub for limited rotary movement relative thereto, said spring being connected between the hub and wheel and under tension sufficient to effect movement of the wheel sufficient to displace the position of said sliced portion relative the roller when the locking device is released and cause the periphery of the wheel to engage the roller.

15. The combination as described in claim 6 in which there is included a plurality of cords stretched below said key-levers, and a plurality of electrical switches normally open and each connected to be operated by movement of a said cord, each switch being connected in series with a said locking device, said cords arranged relative to the encoding on the key-levers so as to be movable to selectively close a said switch in predetermined sequence to effect operation of the Braille apparatus to imprint a Braille character corresponding to the character imprinted by the key-lever depressed.

16. The combination as described in claim 2 in which the platen of the typewriter is provided with a pair of spaced apart upstanding supporting shoulders for supporting thereon a sheet of paper sufficiently spaced from the paper table of the typewriter to accommodate the embossed Braille characters without being compressed as the paper sheet is moved between said platen and table.

17. The combination as described in claim 6 in which there is included a plurality of cords operably connected to normally open electrical switches each connected in series with a said locking device, and said key-levers have a depending lug system adapted to move the said cords individually upon manual depression of a key-lever to close the switch to which connected whereupon corresponding Braille characters may be embossed on a sheet of paper simultaneously with manual operation of the typewriter corresponding to the visual characters imprinted.

18. The combination as described in claim 10 in which there is a plurality of sets of control members each set corresponding to two different coding system, and said sets are mounted on a spindle rotatable to selectively position each set of control members for proper operation to control depression of said key-levers.

References Cited in the file of this patent

UNITED STATES PATENTS 2,605,879    O'Halloran             Aug. 5, 1952